United States Patent [19]

Pearcy et al.

[11] Patent Number: 5,317,608
[45] Date of Patent: May 31, 1994

[54] METHOD FOR THERMALLY TREATING DISCHARGED NUCLEAR FUEL

[75] Inventors: English C. Pearcy; Hersh K. Manktala, both of San Antonio, Tex.

[73] Assignee: Southwest Research Institute, San Antonio, Tex.

[21] Appl. No.: 944,672

[22] Filed: Sep. 14, 1992

[51] Int. Cl.$^5$ .............................................. G21F 9/30
[52] U.S. Cl. ...................................... 376/261; 252/633
[58] Field of Search .............. 376/261, 272, 421, 422, 376/463; 252/633, 627

[56] References Cited

U.S. PATENT DOCUMENTS

| | | | |
|---|---|---|---|
| 4,399,108 | 8/1983 | Krikorian et al. | 252/627 |
| 4,514,364 | 4/1985 | Stoll et al. | 252/627 |
| 4,563,327 | 1/1986 | Minkov | 376/359 |
| 5,082,603 | 1/1992 | Horie et al. | 252/633 |

*Primary Examiner*—Daniel D. Wasil
*Attorney, Agent, or Firm*—Baker & Botts

[57] ABSTRACT

A method for controlling the release of nuclear fission products (including Mo, Tc, Ru, Rh, and Pd) associated with spent nuclear fuel heats the spent nuclear fuel to a predetermined temperature for a predetermined period of time. The predetermined temperature is sufficiently high to diffuse the nuclear fission products within the spent nuclear fuel and sufficiently low to avoid the release of volatile fission products from within the fuel. The predetermined period of time is sufficiently long to cause an optimal degree of phase redistribution of the nuclear fission products within the spent nuclear fuel. The product of the process is spent nuclear fuel characterized by separation of the nuclear fission products into discrete Mo-Tc-Ru-Rh-Pd phases within the spent nuclear fuel. The Mo-Tc-Ru-Rh-Pd phases make the spent nuclear fuel safer for long-term disposal in geologic repositories.

17 Claims, 1 Drawing Sheet

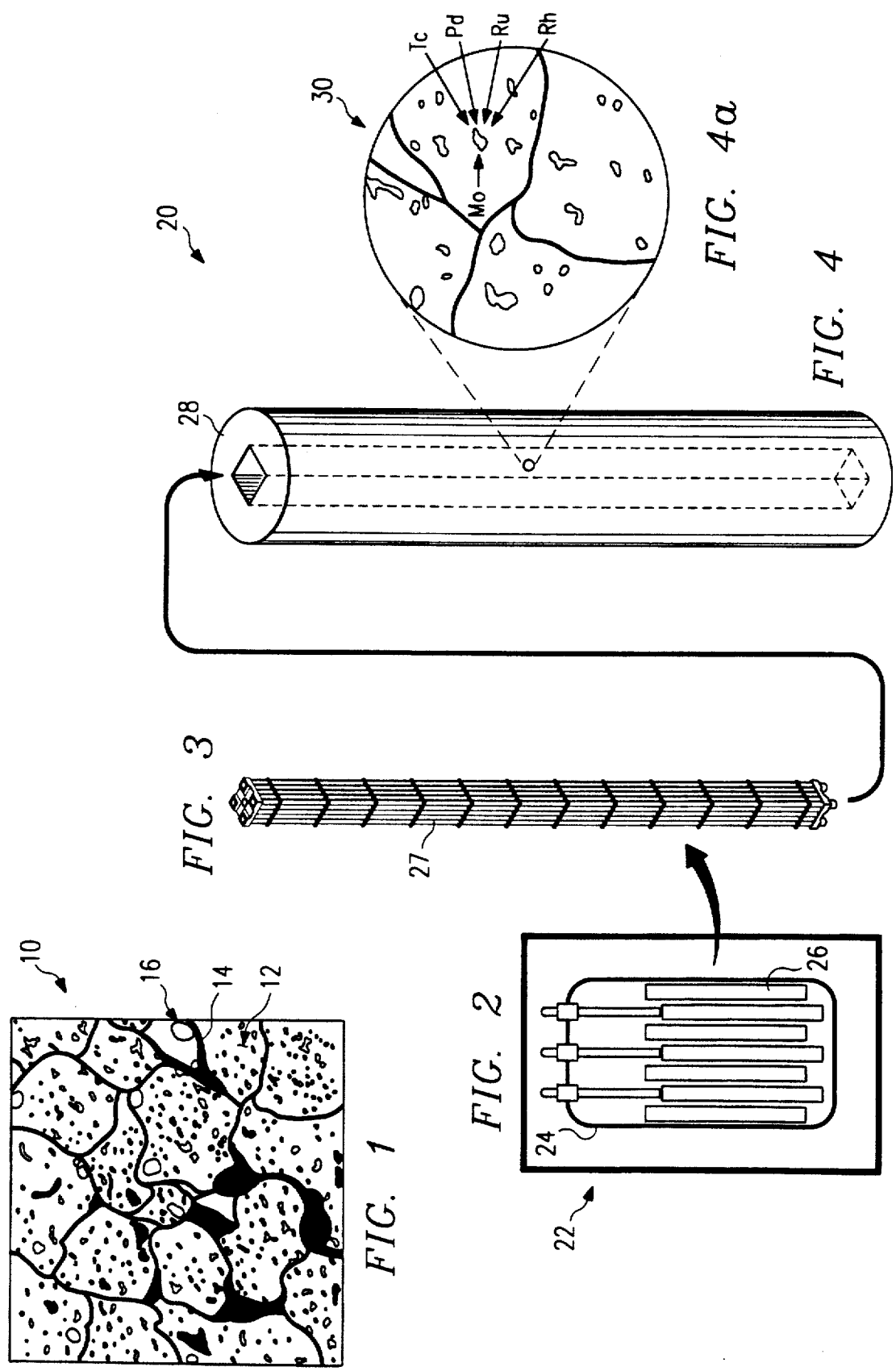

METHOD FOR THERMALLY TREATING DISCHARGED NUCLEAR FUEL

The U.S. Government has a paid-up license in this invention and the right, in limited circumstances, to require the patent owner to license others on reasonable terms as provided for by the terms of a contract with the United States Nuclear Regulatory Commission having the number NRC-02-88-005.

TECHNICAL FIELD OF THE INVENTION

The present invention relates generally to the field of nuclear reactor fuel. More specifically, the present invention relates to post-irradiation thermal treatment of uranium dioxide fuels to enhance the formation of metal-rich phases beneficial for hazardous radionuclide retention.

BACKGROUND OF THE INVENTION

There are more than 400 commercial nuclear power reactors worldwide. Over 90% of these nuclear reactors use fuel which is composed almost entirely of uranium dioxide ($UO_2$). During irradiation, elements not found in the fresh fuel are produced within the fuel as a result of fission of the uranium atom nuclei. Many of these newly generated radionuclides emit radiation which is extremely hazardous to humans. Such spent nuclear fuel from commercial power reactors constitutes the bulk of high-level nuclear waste (HLW). Selective removal of these hazardous radionuclides from the spent fuel is difficult, expensive, and, in some countries, is prohibited by government regulations. Most countries have specified that after removal from the reactor, spent nuclear fuel shall ultimately be disposed of in geologic repositories that are deep, mined cavities in stable geologic formations. These geologic repositories will isolate the hazardous radionuclides from the accessible environment. Such laws ensure the health and safety of the public (See, e.g., the United States Nuclear Waste Policy Act of 1982, as amended, 42 U.S.C. §10101.)

During the long time periods (i.e., thousands to millions of years) envisioned for disposal in geologic repositories, spent fuel may come in contact with groundwater. Laboratory experiments, however, show that spent fuel is readily oxidized and dissolved by many common groundwaters. Dissolution of the spent fuel presents an unacceptable risk of releasing the previously sequestered hazardous radionuclides into the groundwater. This is because, upon release into the groundwaters, the hazardous radionuclides may be transported to the accessible environment. This poses a serious threat to public health and safety.

At present, electric utilities that produce power from nuclear reactors do not directly address these problems. In the conventional nuclear fuel engineering sequence, fuel for nuclear power reactors is fabricated, irradiated, and then removed from the reactor to be temporarily stored prior to final disposal in a geologic repository. Each step of the sequence is engineered to optimize power production characteristics and to provide for safe operation and handling of the fuel during power production and storage. Over the past three decades, significant improvements have been made to the nuclear fuel engineering sequence to optimize fuel costs and performance. However, no part of the fuel engineering sequence is designed to enhance fuel material attributes that improve the retention of hazardous fission products within the spent fuel that a geologic repository may hold.

In light of the above, the safe, long-term retention of hazardous radionuclides within a spent fuel geologic repository is a high priority need for commercial nuclear power producers in numerous countries worldwide, including the United States. Important technical design aspects of these repositories have been the subject of intense interest and research world-wide for many years. Nevertheless, one of the critical design aspects that remains to be decided is the character or material attributes of the spent fuel to be stored in the geologic repositories. At a minimum and in light of the above, the character of spent nuclear fuel must be engineered so that the spent fuel retains the hazardous radionuclides and prevents them from entering groundwater systems, as well as satisfies legal restrictions that control spent fuel reprocessing.

Accordingly, there is a need for a method that properly prepares spent nuclear fuel for disposal in deep geologic formations so as to avoid oxidation and dissolution of hazardous radionuclides in groundwater.

There is a further need for a method that economically prepares spent nuclear fuel for long-term storage without affecting the operation and utility of existing and planned nuclear power plants.

SUMMARY OF THE INVENTION

The present invention, accordingly, provides a method for post-irradiation treatment of uranium dioxide fuels in which hazardous fission products are redistributed within the spent nuclear fuel into stable metallic phases that effectively retain the hazardous fission products during the chemical alteration of the fuel that is expected during long-term geologic disposal. Without the method of the present invention, spent fuel disposal in a geologic repository could easily result in the release of hazardous fission products into the environment. Therefore, the present invention overcomes existing limitations in the known nuclear fuel engineering sequence.

According to one aspect of the present invention, there is provided a method for controlling release of fission products, some of which are hazardous radionuclides, associated with spent nuclear fuel. The method includes the steps of heating the spent nuclear fuel to a predetermined temperature for a predetermined period of time. The predetermined temperature is sufficiently high to diffuse metallic fission products within the spent nuclear fuel and is sufficiently low to avoid the release of volatile fission products from within the fuel. The predetermined time is sufficiently long to cause an optimal degree of fission product redistribution within the spent nuclear fuel. This process results in the incorporation of hazardous radionuclides within metal-rich phase segregations which are strongly resistant to chemical attack, dissolution, and the resulting release of the hazardous radionuclides into the environment.

A technical advantage of the present invention is that controlled post-irradiation thermal treatment of the fuel causes fission products produced during irradiation to diffuse through the spent fuel and to form distinct, metal-rich phases. These metal-rich phases exhibit properties desirable for long-term disposal in geologic repositories. These phases are strongly resistant to chemical alteration by commonly occurring groundwaters around the world. Even strong acids do not dissolve these phases. Radionuclides incorporated within these phases are, therefore, effectively insoluble and not subject to dissolved aqueous transport from a geologic repository into the environment.

Another technical advantage of the present invention is that the thermal treatment that it provides may be accomplished by any one of a wide variety of various conventional and widely-used industrial heating technologies (e.g., electric resistance coils, electric furnaces or combustion furnaces.)

Moreover, the method of the present invention satisfies public safety concerns, permits compliance with Federal Nuclear Disposal Regulations, and imposes little, if any, additional fuel handling or processing burdens on existing and planned industrial nuclear power plants.

BRIEF DESCRIPTION OF THE DRAWINGS

Other technical advantages of the present invention will be apparent from a reading of the specification and appended claims when read in conjunction with the drawings, wherein:

FIG. 1 provides a conceptual illustration of a nuclear fuel photomicrograph to illustrate the material characteristics of nuclear fuel as modified by the method of the preferred embodiment; and FIGS. 2 through 4 conceptually illustrate the portion of the nuclear fuel engineering sequence that the preferred embodiment provides.

DETAILED DESCRIPTION OF THE INVENTION

During irradiation in a reactor, new elements form in the nuclear fuel as a result of fission of the uranium atom nuclei. These newly generated radionuclides behave in different manners depending on their physical, chemical, and nuclear characteristics. Volatile elements tend to escape from the fuel and concentrate in pores within the fuel grains, at grain boundaries, and at gaps between the fuel pellets and the metal cladding that encloses the fuel. Less volatile elements may remain in solid solution or may form separate intra- and inter-crystalline phases within the uranium dioxide.

Fission products occur in four major phase types, including (1) oxides dissolved in the $UO_2$ matrix (e.g., Sr, Zr, Nb, Y, La, Ce, Pr, Nd, PM, and Sm), (2) oxides insoluble in the $UO_2$ matrix (e.g., Rb, Cs, Ba, Zr, Nb, Mo, and Te); (3) gases and volatile phases (e.g., Kr, Xe, Br, and I); and (4) metal alloys (e.g., Mo, Tc, Ru, Rh, Pd, Ag, Cd, In, Sn, Sb and Te). Elements in these four groups are subject to different release mechanisms when the spent nuclear fuel contacts groundwater. Some of the phase types are easily removed from the fuel, others are fugitive (e.g., gases) from the fuel, whereas others are relatively immobile (e.g., metal alloys).

A subset of the metal-rich phases formed during normal irradiation of nuclear fuels is composed predominantly of Mo, Tc, Ru, Rh, and Pd. Some isotopes of the above-identified elements are long-lived and extremely hazardous. As such, these radionuclides are of great concern for spent nuclear fuel disposal. Phases composed predominantly of these elements form during irradiation within a reactor, as fission-produced Mo, Tc, Ru Rh, and Pd diffuse through the $UO_2$ lattice and accumulate as sub-micron particles within the $UO_2$ grains. As fission produces additional Mo, Tc, Ru, Rh, and Pd and as temperature increases and thermal gradients are established in the $UO_2$ lattices, these metals migrate to $UO_2$ grain boundaries where larger particles form.

Studies of noble metal inclusions in spent fuel concentrate on fuel that has experienced comparatively high centerline temperatures, typically above approximately 1200° C. Under these conditions, the metal-rich phase accumulations are relatively large and easily observable. Such high temperatures are not, however, required to initiate phase segregation. In commercial light-water reactors (LWRs), fuel centerline temperatures are typically lower than 1200° C. Nevertheless, sub-micron accumulations of noble metal-rich phases have been observed. Even fuels with moderate burnup (27 MWd/kgU) have been found to contain 5 to 10 nm diameter inclusions within individual $UO_2$ crystals and to have larger noble metal particles, up to 30 nm diameter, along grain boundaries. This evidence demonstrates that incipient formation of the metallic phases occurs during typical commercial nuclear reactor operations, even in moderate temperature and moderate burnup fuel conditions.

Table 1 provides compositional data of metal inclusions found to occur in $UO_2$ matrices reported as mass ratios relative to Tc.

TABLE 1

|  | Mo | Tc | Ru | Rh | Pd |
|---|---|---|---|---|---|
| Calculated Fission Yield | 4.2 | 1 | 1.8 | na* | na |
| Measured Ratio[1] | 3.7 | 1 | 1.6 | na | na |
| Calculated Fission Yield | 4.1 | 1 | 1.8 | 0.5 | na |
| Measured Ratio[2] | 3.3 | 1 | 1.4 | 0.4 | na |
| Calculated Fission Yield | 4.2 | 1 | 2.8 | 0.6 | 1.8 |
| Measured Ratio[3] | 4.0 | 1 | 3.0 | 0.5 | 1.5 |

[1] B.T. Bradbury, J.T. Demant, P.M. Martin and D.M. Poole, "Electron Probe Micro-Analysis of Irradiated $UO_2$," Journal of Nuclear Materials, vol. 17, pp. 227-236 (1965).
[2] B.M. Jeffery, "Microanalyses of Inclusions in Irradiated $UO_2$," Journal of Nuclear Materials, vol. 22, pp. 33—40 (1967).
[3] L.E. Thomas, R.E. Einzinger, and R.E. Woodley, "Microstructural Examination of Oxidized Spent PWR Fuel by Transmission Electron Microscopy," Journal of Nuclear Materials, vol. 166, pp. 243-251 (1989).
na* = not reported These inclusions begin to form under normal operating conditions and relatively consistently include the five elements identified earlier, i.e., Mo, TC, Ru, Rh, and Pd in certain ratios. The ratios are similar to the predicted fission yields observed under operating conditions. This indicates that the five elements have similar rates, directions, and modes of diffusion through the $UO_2$ crystal lattice. Therefore, the possibility exists that these elements could be completely segregated from the $UO_2$ matrix under some conditions.

FIG. 1 conceptually illustrates a photomicrograph of spent nuclear fuel that shows noble metal alloy inclusions formed in the spent fuel. For example, the photomicrograph of spent nuclear fuel matrix 10 illustrates pits, holes or defects 12 within $UO_2$ crystal boundaries 14. But more importantly, within matrix 10 alloy inclusion 16 appears. The alloy of inclusion 16 generally is composed of the metals of Table 1.

During normal reactor operation, though separation of Mo-Tc-Ru-Rh-Pd phases may begin, separation is not complete. A certain amount of each element (depending on reactor operating conditions) remains dispersed in the $UO_2$ lattice in elemental form. Such incomplete segregation is supported by spent fuel leaching studies in which Tc is found to dissolve out of the fuel matrix into solution under the influence of mildly oxidizing groundwaters. The Tc released into solution by such groundwater oxidation appears not to have been incorporated into the metallic inclusions, but to have been present only as elemental Tc within the $UO_2$ lattice. This observation is further supported by leaching experiments which indicate reduced release of Tc into solution from higher burnup fuel than from fuel with a lower burnup.

Many scenarios for radionuclide release from a repository are based on liberation of the radionuclides by oxidative dissolution of the spent fuel matrix. The dissolving fluids are typically chosen to approximate common groundwaters (i.e., low salinity with near neutral pH and slightly oxidizing Eh). Compared to the spent fuel $UO_2$ matrix, however, the Mo-Tc-Ru-Rh-Pd phases are strongly resistant to chemical alteration. Oxidation of spent fuel under low-temperature, moist-air conditions sufficient to induce alteration of $UO_2$ to $U_4O_9$ found no corrosive or other detectable effects on the noble metal inclusions within the fuel. L. E. Thomas, R. E. Einzinger, and R. E. Woodley, "Microstructural Examination of Oxidized Spent PWR Fuel by Transmission Electron Microscopy," *Journal of Nuclear Materials*, vol. 166, pp. 243-251 (1989). Furthermore, these metallic phases have been isolated for study by dissolving the enclosing $UO_2$ by 6.5N nitric acid, which left the Mo-Tc-Ru-Rh-Pd phases virtually untouched. See, e.g., J. I. Bramman, R. M. Sharpe, D. Thorn, and G. Yates, "Metallic Fission-Product Inclusions in Irradiated Oxide Fuels," *Journal of Nuclear Materials*, vol. 25, pp. 201-215 (1968); and H. Kleykamp, "Constitution and Thermodynamics of the Mo-Ru, Mo-Pd, Ru-Pd, and Mo-Ru-Pd Systems," *Journal of Nuclear Materials*, vol. 167, pp. 49-63 (1989). In fact, fusion of the metallic phase with $NaOH-Na_2O_2$ at 600° C. was found necessary to form a soluble material in one study.

In a geologic high-level waste repository, spent fuel may be exposed to ambient groundwaters. Though locally the oxidizing potential of the groundwater may be enhanced by radiolysis, its dissolution capacity will not approach that of concentrated $HNO_3$. As stated earlier, the noble metal phases resist corrosion, even by strong acids. This suggests that radionuclides incorporated into such bodies could be effectively retained in an insoluble form even if the fuel matrix were entirely dissolved.

FIGS. 2 through 4, therefore, show a process flow 20 that conceptually depicts the preferred process of the present invention. Beginning at nuclear reactor 22, within reactor core 24, fuel rods 26 enclose nuclear fuel. Irradiation of fuel rod 26 produces spent fuel rod 27 that, according to the preferred process of the present invention, is removed from reactor 22. Spent fuel rod 27 is then placed in a heating unit, shown conceptually as heating unit 28. Within heating unit 28, spent fuel rod 27 is heated to a sufficiently high temperature to form metallic segregations composed of Mo, Tc, Ru, Rh, and Pd. Microscopic diagram 30 depicts the diffusion of these metallic fission-products within a spent fuel lattice structure similar to that described in FIG. 1 above. In particular, by being heated in heating unit 28, $UO_2$ lattice structure 30 forms metallic inclusions that have lower free energies than the dispersed component elements. The process of the preferred embodiment, therefore, prepares spent fuel rod 27 for long-term disposal with a significantly reduced threat of release of hazardous radioactive material to the surrounding environment.

The following discussion more particularly points out detailed aspects of the preferred embodiment. For example, during normal commercial irradiation of nuclear fuel, the fission products Mo, Tc, Ru, Rh, and Pd are produced by nuclear fission and are lodged within the fuel matrix consisting of intergrown $UO_2$ crystals. These fission products are formed in both pressurized water reactors (PWRs) and boiling water reactors (BWRs). Therefore, fuel from both reactor types may be prepared by the preferred embodiment after irradiation. The spent fuel rod 27 may be handled as a fuel assembly consisting of an array of fuel rods, or as individual rods. There is no need to remove the fuel pellets from the rods for treatment. The rods must, however, be handled as vertically as possible in order to avoid flexing which could cause the cladding to rupture and fail.

Spent fuel rod 27 is placed vertically into heating unit 28. The thermal treatment may be accomplished by any one of the various conventional and widely-used industrial heating technologies (e.g., electric resistance coils, an electric furnace, or a combustion furnace). Also, the type of heating unit 28 may vary according to different local economic considerations such as different fuel costs.

Spent fuel rod 27 is heated to a temperature between 1200° C. and 1400° C. This temperature range is adequate to induce diffusion of the elements of interest (i.e., Mo, Tc, Ru, Rh, and Pd) without creating unnecessary stress that might rupture the fuel cladding. Temperatures above 1400° C. should be avoided, because they promote unacceptable movement of volatile fission products into the fuel-cladding gap where they would be easily released in the event of a cladding breach.

Spent fuel rod 27 is heated for a period of time that optimizes fission product separation. This time period will be a function of the fuel type, grain size, burnup, and operating history. The fuel operating history includes factors such as treatment temperature, the pattern of heating ramp-up (e.g., linear, non-linear, step-wise and etc., or combinations of these), and the steady-state temperature profile within spent fuel rod 27. Based on extrapolation of experimental results reported by F. D'annucci, C. Sari and G. Schumacher, "Migration of Metallic Fission Products in Reactor Oxide Fuels," *Nuclear Technology*, vol. 35, pp. 80-86 (1977), the duration of heat treatment for most fuels will fall in the range between four hours to ten days. The optimal heating period for a given fuel rod, however, will be a function of its specific characteristics.

The interior of spent fuel pellet 30 during the heat treatment schematically illustrates the diffusion of Mo, Tc, Ru, Rh, and Pd through the $UO_2$ crystal lattice. To the extent practicable, the formation of larger metallic particles is desirable as larger particles have a lower surface-to-volume ratio. Also, larger particles will reduce the likelihood of their transport as colloids. This process, therefore, gathers the metallic elements to form chemically resistant alloy inclusions that effectively sequester the radionuclides from chemical reactions with groundwaters in and near geologic repositories and that can result in the subsequent release of the radionuclides into the environment.

In summary, there is shown a method for enhancing retention of the nuclear fission products within nuclear fuel that includes the step of heating the spent nuclear fuel to a predetermined temperature for a predetermined period of time such that the predetermined temperature is sufficiently high to diffuse the nuclear fission products within the nuclear fuel to form an insoluble nuclear fission-product phase, but sufficiently low to avoid degradation of the spent nuclear fuel and movement of volatile fission products between the spent nuclear fuel and the fuel cladding, and wherein the predetermined period of time is sufficiently long to cause an optimal degree of phase redistribution of fission products to form said insoluble nuclear fission product phase within the spent nuclear fuel, and as a result, to lower the solubility of hazardous radionuclides from the spent nuclear fuel.

While a specific embodiment of the present invention has been disclosed, it is to be realized by those skilled in the art that various other implementations may be originated to accomplish the design concept of a method and product from the method of thermally treating discharged nuclear fuel for enhancing retention of nuclear fission products. Thus, we wish to be limited only by the scope of the appended claims.

What is claimed is:

1. A method for enhancing retention of nuclear fission products within irradiated nuclear fuel, comprising the steps of:
   heating said irradiated nuclear fuel to a predetermined temperature for a predetermined period of time;
   said predetermined temperature being sufficiently high to diffuse said nuclear fission products within said irradiated nuclear fuel to form insoluble nuclear fission-product phases within said irradiated nuclear fuel and sufficiently low to avoid movement of volatile fission products from said irradiated nuclear fuel; and
   said predetermined period of time ranging from approximately 7 hours to approximately 10 days and being sufficiently long to cause substantially all of said nuclear fission products within said irradiated nuclear fuel to form into said nuclear fission-product phases.

2. The method of claim 1, wherein said heating step further comprises the step of heating said irradiated nuclear fuel and said nuclear fission products with a plurality of electric resistance coils.

3. The method of claim 1, wherein said heating step further comprises the step of heating said irradiated nuclear fuel and said nuclear fission products in an electric furnace.

4. The method of claim 1, wherein said heating step further comprises the step of heating said irradiated nuclear fuel and said nuclear fission products in a combustion furnace.

5. The method of claim 1, wherein said heating step further comprises the step of heating said irradiated nuclear fuel and said nuclear fission products to a temperature of less than approximately 1400 degrees centigrade.

6. The method of claim 5, wherein said heating step further comprises the step of heating said irradiated nuclear fuel and said nuclear fission products to a temperature greater than approximately 1200 degrees centigrade.

7. The method of claim 1, wherein said heating step further comprises the step of heating said irradiated nuclear fuel and said nuclear fission products to a temperature greater than approximately 1200 degrees centigrade.

8. The method of claim 1, wherein said predetermined temperature is sufficiently high and said predetermined time is sufficiently long for phase redistribution of Mo within said irradiated nuclear fuel.

9. The method of claim 1, wherein said predetermined temperature is sufficiently high and said predetermined time is sufficiently long for phase redistribution of Ru within said irradiated nuclear fuel.

10. The method of claim 1, wherein said predetermined temperature is sufficiently high and said predetermined time is sufficiently long for phase redistribution of Tc within said irradiated nuclear fuel.

11. The method of claim 1, wherein said predetermined temperature is sufficiently high and said predetermined time is sufficiently long for phase redistribution of Pd within said irradiated nuclear fuel.

12. The method of claim 1, wherein said predetermined temperature is sufficiently high and said predetermined time is sufficiently long for phase redistribution of Rh within said irradiated nuclear fuel.

13. The method of claim 1, wherein said predetermined period of time spans a period approximately greater than four hours and approximately less than ten days.

14. The method of claim 1, wherein said predetermined period of time spans a period of time approximately greater than four hours.

15. The method of claim 1, wherein said predetermined period of time spans a period of time approximately less than ten days.

16. An enhanced form of spent nuclear fuel for retention of nuclear fission products in a repository, comprising:
   said nuclear fission products comprising a plurality of insoluble nuclear fission-product phases, said nuclear fission-product phases formed by heating said spent nuclear fuel to a predetermined temperature for a predetermined period of time;
   said predetermined temperature being sufficiently high to diffuse said nuclear fission products within said spent nuclear fuel to form said insoluble fission-product phases within said spent nuclear fuel and sufficiently low to avoid movement of volatile fission products from said spent nuclear fuel; and
   said predetermined period of time ranging from approximately 7 hours to approximately 10 days and being sufficiently long to cause substantially all of said nuclear fission products to form into said insoluble nuclear fission-product phases within said spent nuclear fuel.

17. The article of claim 16, wherein said insoluble nuclear fission-product phases comprise a Mo-Tc-Ru-Rh-Pd phase within said spent nuclear fuel.

* * * * *

UNITED STATES PATENT AND TRADEMARK OFFICE
CERTIFICATE OF CORRECTION

PATENT NO. : 5,317,608
DATED : May 31, 1994
INVENTOR(S) : Pearcy, et al

It is certified that error appears in the above-indentified patent and that said Letters Patent is hereby corrected as shown below:

On the title page, in Item No. 75, correct the second inventor's name to read HERSH K. MANAKTALA.

Signed and Sealed this

Fourteenth Day of March, 1995

Attest:

BRUCE LEHMAN

*Attesting Officer*   *Commissioner of Patents and Trademarks*